United States Patent [19]

Kishi et al.

[11] Patent Number: 5,156,877
[45] Date of Patent: Oct. 20, 1992

[54] PROTEIN-RICH PRODUCTS OF BREWER'S SPENT GRAIN ORIGIN

[75] Inventors: Sohtaroh Kishi, Kashiwa; Takashi Kimura, Yokohama; Takeshi Minami, Kawasaki; Haruto Kobayashi, Yokohama, all of Japan

[73] Assignees: Kirin Beer Kabushiki Kaisha; Chiyoda Corporation, both of Japan

[21] Appl. No.: 656,593

[22] Filed: Feb. 19, 1991

Related U.S. Application Data

[63] Continuation-in-part of Ser. No. 437,639, Nov. 16, 1989.

[30] Foreign Application Priority Data

Feb. 20, 1990 [JP] Japan ................................ 2-40516

[51] Int. Cl.$^5$ ............................................ A23L 1/10
[52] U.S. Cl. ..................................... 426/624; 426/417; 426/436; 426/481; 426/482; 426/478; 426/656
[58] Field of Search ................. 426/417, 31, 478, 482, 426/624, 656, 481, 436

[56] References Cited

U.S. PATENT DOCUMENTS 4,377,601  3/1983  Dreese et al. ........................ 42/472
4,547,382  10/1985  Gannon ................................ 426/482

FOREIGN PATENT DOCUMENTS 369818    5/1990  European Pat. Off. .
3704651   8/1988  Fed. Rep. of Germany .
2105565   3/1983  United Kingdom .
7900982  11/1979  World Int. Prop. O. .

Primary Examiner—Joseph Golian
Assistant Examiner—Evan Federman
Attorney, Agent, or Firm—Lorusso & Loud

[57] ABSTRACT

A protein-rich composition of brewer's spent grain origin is disclosed, which includes products separated from the husks of BSG and which contains 40 to 60% by weight of proteins, 12 to 18% by weight of lipids, 2 to 6% by weight of fibrous materials, and 1 to 4% by weight of ashes based on dry weight.

4 Claims, No Drawings

PROTEIN-RICH PRODUCTS OF BREWER'S SPENT GRAIN ORIGIN

CROSS-REFERENCE TO RELATED APPLICATION

This application is a continuation-in-part application of U.S. Ser. No. 07/437,639 filed Nov. 16, 1989.

BACKGROUND OF THE INVENTION

This invention relates to protein-rich products of the origin of brewer's spent grain (hereinafter referred to as BSG). The protein-rich products are suited as feed for farm, animals and cultured fish, and are quite useful as food material such as starting materials for proteinaceous nutrients and seasonings.

As a vegetable, protein-rich product, soybean and defatted soybean are most widely used. Especially defatted soybean is the standard of vegetable protein source. However, soybean-producing districts are localized in the world, and a problem of short supply of soybean can arise on account of unseasonable weather. In addition, soybean supply in a number of countries almost completely depends upon import, with the import price varying depending upon various factors. Hence vegetable protein sources alternative to soybean or defatted one, which can be supplied stably at low prices, are needed.

On the other hand, since BSG, which is a by-product of beer production, contains protein in an amount of as low as about 25 % based on dry weight and contains fibrous materials and nitrogen-free solubles in a sum amount of as high as nearly 60 %, its use has been limited at present to ruminants such as cattle and sheep. Accordingly, it has been desired to separate a protein-rich fraction from BSG.

In order to increase a protein content, attempts have been made to mill and sieve dry BSG (U.S. Pat. Nos. 4,377,601 and 4,547,382). In this process, husks become so fine in the grinding step that separation thereof from a protein-containing fraction becomes difficult, and the protein content of the resulting product is still as low as 30 to 40% by weight based on dry weight, and thus the product is still insufficient as a protein source. In addition, the process has another defect in that, since raw BSG contains water, a large amount of heat energy is required for drying it.

Japanese Unexamined Patent Publication No. 51-129,776 discloses a process of extracting BSG using an alkaline aqueous solution of 11-12 in pH at a temperature of 220 F-250 F (104° C.-121° C.), then precipitating a protein-rich product from the thus-obtained extract by isoelectric precipitation. This process, however, involves decomposition of proteins due to the severe, high-temperature extraction condition, resulting in a decreased yield of proteins and deteriorated quality of the product. In addition, this process requires a large amount of heat energy for extraction at an elevated temperature. Further, the protein-rich product obtained by this process does not contain lipid contained in BSG, with the lipid, important as feed for farm animals and fish, being wasted.

SUMMARY OF THE INVENTION

It has now been found that protein-rich products which are inexpensively obtained by pressing BSG in a wet state, then sieving the pressed BSG in water and drying, contain protein and lipid in high contents, and that the pepsin-digestibility of the protein (about 90%) is high, thus being highly useful for feed and material for foods. The gross energy of the invented product is higher than that of defatted soybean.

There is provided in accordance with the present invention a protein-rich composition of BSG origin, which comprises products separated from the husks of BSG and which contains 40 to 60% by weight of proteins, 12 to 18% by weight of lipids, 2 to 6% by weight of fibrous materials, and 1 to 4% by weight of ashes.

In this specification, the contents of proteins, lipids, fibrous materials, ashes, nitrogen-free solubles, water, etc. are measured according to the analytical methods for feed ingredients shown in "Tables of Japanese Standard Feed Ingredients (1987-year ed.)", chapter 3 (compiled by Ministry of Agriculture, Foresty and Fisheries, The Bureau of Conference on Technology of Agriculture, Forestry and Fisheries).

Other objects, features and advantages of the present invention will become apparent from the detailed description of the invention to follow.

DETAILED DESCRIPTION OF THE INVENTION

The process for producing the protein-rich products of the present invention is described in detail below.

BSG is a saccharification residue of brewer's malt (optionally containing rice, corn grits, corn starch, etc. as secondary starting materials) produced as a by-product in production of beer. Usually, the BSG, which is separated from wort in a wet state by means of a solid-liquid separator such as a lauter tub or a mash filter, has a water content of about 80% by weight and contains about 25% by weight of proteins on dry basis. BSG with a water content of about 70-80% by weight separated from the wort may be used as such, or may be dewatered or moistened before use. Or, dried BSG may be moistened to be adapted for use as the starting material.

This process involves the step of pressing BSG in a wet state. The BSG is constituted by husks, germs and other particles (mainly derived from aleurone layers) and their contents of proteins are about 5% by weight, about 50% by weight and about 50% by weight, respectively. The germs and other particles having a high protein content are bound or stuck to the husks as vegetable tissues. Therefore, the protein-rich products of the present invention can be obtained by separating the particulate portion from the (fibrous) husks.

The inventor's investigation has revealed that, when BSG is pressed in a wet state, germs and other particles having a high protein content are separated from husks and, at the same time, the separated germs and the particles are ground, with the husks remaining substantially non-ground and that the thus-obtained pressed BSG can be effectively separated into a protein-containing product (ground germ and particles) and a fibrous product (husk) by sieving the pressed BSG in water.

As the pressing apparatus to be used in the present invention, any grinder which presses the material to be treated may be used. The use of a roll mill is particularly preferred. In the pressing treatment using a roll mill, BSG in a wet state is pressed and partly ground by the pressing force between the rolls to thereby separate from the husks protein-rich germs and particles which have been bound or stuck thereto with the simultaneous grinding of the germs and particles. The gap between rolls is 0.05 to 2 mm, preferably 0.1 to 0.3 mm. In the pressing of BSG, is suffices for the BSG to have a water content sufficient to prevent fine grinding of the husks, with a water content equal to or greater than 65% by weight being particularly preferable. If the water content is too low, part of the husks will be ground to fine particles, which makes it difficult to separate the pressed BSG into husks and a protein-containing product by sieving.

Additionally, in BSG before being processed exists, to some extent, a fine particulate, protein-containing product in a state separate from the husks. It is, therefore, possible to preliminarily sieve such BSG prior to the pressing treatment to thereby separate and recover the fine particulate, protein-containing product. The sieve to be used in this preliminary sieving is of 20 to 50 mesh, preferably 30 to 35 mesh. This sieving treatment is conducted preferably in water.

The pressed BSG obtained as mentioned hereinbefore is then sieved, while maintaining the pressed BSG under a large amount of water, to separate the same into a fibrous fraction comprising husks and a fraction of protein-containing product. Suitable techniques for sieving the pressed BSG in water include, for example, a sieving technique wherein BSG is sieved using a submerged sieve, a sieving technique wherein previously watered BSG is fed to a sieving apparatus, and a sieving technique wherein BSG is sieved with a sieving apparatus while supplying or spraying water thereto. As the sieving apparatus, a vibrating screen is preferably used. Water is used in this sieving step in an amount sufficient to render the ground germ and particles mobile and to prevent them from being entrapped by the husks. The amount of water is generally at least 3 times the weight of the pressed BSG.

In the sieving treatment, a fraction of a fibrous product (size: 1–5 mm) composed of husks can be obtained as a plus fraction. For this purpose, sieve opening is of 5–20 mesh, preferably 10–15 mesh. On the other hand, the fraction passing through this sieve includes a fraction of fine particles having a high protein content and coarse particles having a lower protein content than the fine particles. In order to separate the former fraction of more protein-rich product (fraction of fine particles), further sieving is conducted using a sieve of 20–50 mesh, preferably 30–35 mesh. In this sieving treatment, the coarse particles product is retained on the sieve, whereas the fine particles product is permitted to pass through the sieve.

The sieving treatment described above is not particularly limited as to the number of times of sieving, order of sieving treatments, and other conditions, which may be varied and properly selected in consideration of clogging of sieve opening, etc. The aforesaid pressing treatment and the sieving treatment are preferably repeated several times (2 to 5 times) for the purpose of effectively separating and recovering the fraction of protein-rich product (fraction of fine particles). For example, a fraction of fibrous product is separated from the pressed BSG by first sieving, the remaining fraction is again sieved by second sieving to thereby separate it into a fraction of coarse particles and a fraction of fine particles, the fraction of coarse particles is again pressed, and the thus-obtained pressed coarse particles are sieved into a fraction of fine particles and a fraction of coarse particles. The thus-recovered protein-containing product is dried and ground to produce particulate product.

The combination of pressing treatment and sieving treatment described above enables one to obtain a fine particulate protein-rich product (fraction of fine particles) having a protein content of 40% by weight or more (based on dry weight), a protein-containing product (fraction of coarse particles) having a protein content of about 25% by weight (based on dry weight), and a fibrous product composed of husks.

The protein-rich particles of the present invention, which mainly comprise the fine particulate, protein-rich product described above, contain a saccharification residue of germs or endosperm of brewer's malt used as primary starting materials for production of beer. Further, they optionally contain fine particles of the saccharification residue of rice, corn grits, corn starch, etc. used as secondary starting materials. The content of the saccharification residue of the secondary starting material origin usually ranges from 0 to 30% by weight.

The inventor's investigation has revealed that the thus-obtained fine particulate, protein-rich product has an extremely advantageous ingredient composition in view of using it as feed, feed component or starting materials for proteinaceous nutrients and seasonings. That is, the fine particulate, protein-rich product contains 40 to 60% by weight, preferably 45 to 55% by weight of proteins; 12 to 18% by weight, preferably 15 to 18% by weight of lipids; 2 to 6% by weight of fibrous materials; and 1 to 4% by weight of ashes. Advantageously, the proteins of the particulate product of the present invention have such an amino acid composition that their arginine, lysine and aspartic acid contents are less than those of proteins of conventionally used defatted soybean, with their methionine and cystine contents being higher than the latter, and that the content of proline, which is a typical sweet amino acid, of the former is about double that of the latter. The high methionine and cystine contents of the proteins of the protein-rich products enables one to produce feed having a markedly improved feed value by complementarily combining the products of the present invention with another main protein source of defatted soybean. In addition, the high content of proline enables one to produce a novel seasoning having a taste that can not have been obtained from defatted soybean, by using the products of present invention as a starting material of the seasoning. Further, the products of the present invention have such a high fat content (12 to 18% by weight) that they can be used as an energy source as well as protein source for farm animals and cultured fish.

Specific contents of the above-described ingredients in the protein-rich products of the present invention somewhat vary depending upon the kind of BSG.

In the present invention, however, the contents can be controlled by the degree of the aforesaid sieving.

The protein-rich products of the present invention can be subjected, if necessary, to various modifying treatments. For example, they can be subjected to solvent extraction in a wet state or in a state of being dried at low temperatures (30° to 100° C.) to obtain defatted product. Solvents for the extraction include paraffins such as n-hexane, alcohols such as ethanol, and supercritical carbon dioxide, etc. The defatted product generally contains 45 to 70% by weight of proteins, 1 to 3% by weight of fats, 3 to 6% by weight of fibrous products, and 1 to 4% by weight of ashes. This defatted protein-rich product contains a reduced amount of fats, and can be advantageously used as a starting material for a seasoning.

The protein-rich products of the present invention are usually handled in a dry form but, for some uses, they may be handled in a wet state. In this case, they are advantageously adjusted to 70 to 80% in water content.

The present invention is now described in more detail by reference to the following Examples.

EXAMPLE 1

About 10 kg of water was added to 3 kg (dry weight: 672 g) of BSG in a wet state (water content: 77.6% by weight), and the resulting mixture was subjected to preliminary sieving in water using a 35-mesh sieve. The fraction of fine particulate protein-containing product which passed through the sieve was dewatered by centrifugation for recovery as a slurry. The plus fraction of coarse particulate protein-containing product was pressed by means of a roll mill (roll-rotating rate: 100 rpm; roll-to-roll gap: 0.1 mm) to thereby separate particles bound or stuck to the husks from the husks and to concurrently grind the particles. Then, this roll mill-treated product was sieved using a 35-mesh sieve to recover a fraction of fine particulate protein-containing product. Again, the plus fraction of coarse particulate protein-containing product was subjected to roll mill treatment and sieving treatment in the same manner to recover a fraction of fine particulate protein-containing product. Once again, the plus fraction of coarse particulate protein-containing product was sieved in water using a 10-mesh sieve to recover 160 g on dry weight of a fibrous product as a fraction composed of only husks remaining on the sieve.

The fine particulate protein-containing product recovered as a slurry in the above-described manner was vacuum dried to obtain 180 g of a dry product. This fine particulate protein-containing product had a protein content of 50.8% by weight based on dry weight.

EXAMPLE 2

300 ml of ethanol was added to 100 g of the protein-rich product obtained in Example 1, followed by extraction treatment at 30° C. for 1 hour. This extraction treatment yielded 85.6 g of defatted protein-rich product (dry product) and 14.4 g of a vegetable oil. This defatted protein-rich product contained 60.4% by weight of proteins, 2.5% by weight of fats, 4.9% by weight of fibrous materials, 2.0% by weight of ashes, and 30.2 % by weight of nitrogen-free solubles.

EXAMPLE 3

About 30 liters of water was added to 10 kg (dry weight: 2.24 kg) of BSG in a wet state (water content: 77.6% by weight), and the resulting mixture was subjected to preliminary sieving in water using a 35-mesh sieve. A fraction of fine particulate protein-containing product which passed through the sieve was dewatered by centrifugation and recovered as a slurry. The plus fraction of coarse particulate protein-containing product remaining on the sieve was pressed by means of a roll mill (roll-rotating rate: 100 rpm; roll-to-roll gap: 0.3 mm) to thereby separate particles bound or stuck to the husks from the husks and to concurrently grind the particles. Then, this roll mill-treated product was sieved using a 10-mesh sieve to recover a fraction of fibrous product composed of only husks remaining on the sieve, and a fraction of fine particulate and coarse particulate protein-containing product which passed through the sieve. Then, this fraction was sieved in water using a 35-mesh sieve to recover a coarse particulate protein-containing product as a plus fraction and a fine particulate protein-containing product as a minus fraction.

The dry weight of the thus recovered fraction of fine particulate protein-containing product was 522 g, with its protein content being 51.49% based on dry weight and the protein-recovery ratio from BSG being 47.2%.

On the other hand, the weight (dry weight) of the fraction of the coarse particulate protein-containing product obtained above was 943 g, with its protein content being 25.9% by weight.

EXAMPLE 4

The fine particulate protein-rich product obtained in the foregoing Example 2 and 3 were analyzed for determining their contents of proteins, fats, fibrous materials, crude ashes, and nitrogen-free solubles (based on dry weight). The results thus obtained are shown in Table 1.

For comparison, analytical results on BSG used as the starting material and on ordinary soybean cake are also shown in Table 1.

TABLE 1

|  | Non-defatted Product of the Invention | BSG | Defatted Soybean | Defatted Product of the Invention |
|---|---|---|---|---|
| Proteins (wt %) | 53.7 | 27.1 | 52.2 | 60.4 |
| Fats (wt %) | 16.2 | 9.8 | 1.5 | 2.5 |
| Fibrous material (wt %) | 3.8 | 16.4 | 6.3 | 4.9 |
| Ashes (wt %) | 2.0 | 4.4 | 6.7 | 2.0 |
| Nitrogen-free solution (wt %) | 24.3 | 42.3 | 33.3 | 30.2 |

EXAMPLE 5

The fine particulate protein-rich product obtained in Example 3 was analyzed for determining the contents of amino acids in the proteins contained in the protein-rich product. The results thus obtained are shown in Table 2.

For comparison, analytical results on the contents of amino acid in the defatted soybean are also shown in Table 2.

The amino acid contents (wt % ) in Table 2 are based on dry weight.

TABLE 2

|  | Contents of amino acids |||||||||||||||||
|---|---|---|---|---|---|---|---|---|---|---|---|---|---|---|---|---|---|
|  | Arg | His | Ileu | Leu | Lys | Met | Cys—S—S—Cys | Phe | Tyr | Thr | Trp | Val | Gly | Ser | Ala | Asp | Glu | Pro |
| Product of the Invention (wt %) | 2.67 | 1.15 | 2.25 | 4.36 | 1.82 | 1.13 | 1.11 | 3.11 | 1.96 | 1.84 | 0.78 | 3.00 | 1.97 | 2.16 | 2.49 | 3.66 | 11.1 | 5.51 |
| Defatted soybean (wt %) | 3.85 | 1.34 | 2.26 | 3.91 | 3.16 | 0.73 | 0.75 | 2.58 | 1.82 | 2.06 | 0.65 | 2.37 | 2.17 | 2.70 | 2.21 | 5.66 | 9.40 | 2.60 |

Additionally, the gross energy of the protein-rich product obtained in Example 3 was analyzed by a combustion method to give the result shown in Table 3. For comparison purposes, the gross energy of the defatted soybean is also shown in Table 3.

TABLE 3

| Gross energy (kcal/kg on dry basis) | |
| --- | --- |
| Product of the Invention | 5,440 |
| Defatted soybean | 4,910 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A protein-rich composition of brewer's spent grain origin, which comprises protein-rich germs and particles, derived mainly from aleurone layers and separated from the husks of BSG, and which contains 50 to 60% by weight of proteins, 12 to 18% by weight of lipids, 2 to 6% by weight of fibrous materials, and 1 to 4% by weight of ashes based on dry weight.

2. A defatted protein-rich composition of brewer's spent grain origin, which comprises protein-rich germs and particles, derived mainly from aleurone layers and separated from the husks of BSK, and which contains 50 to 70% by weight of proteins, 1 to 3% by weight of lipids, 3 to 6% by weight of fibrous materials, and 1 to 4% by weight of ashes based on dry weight.

3. The protein-rich product of claim 1 obtained by a process comprising the steps of:
   providing a wet brewer's spent grain containing husks and protein-rich germs and particles, derived mainly from the aleurone layers, adhering to the husks and having a water content of at least 65% by weight;
   passing said wet brewer's spent grain through a roll mill to press said brewer's spent grain with the simultaneous grinding of the protein-rich germs and particles, thereby separating said protein-rich germs and particles from said husks; and
   sieving the brewer's spent grain after passage through the roll mill to obtain the protein-rich product, containing the protein-rich germs and particles, as a minus fraction and the husks as a plus fraction.

4. The protein-rich product of claim 2 obtained by a process comprising the steps of:
   providing a wet brewer's spent grain containing husks and protein-rich germs and particles, derived mainly from the aleurone layers, adhering to the husks and having a water content of at least 65% by weight;
   passing said wet brewer's spent grain through a roll mill to press said brewer's spent grain with the simultaneous grinding of the protein-rich germs and particles, thereby separating said protein-rich germs and particles from said husks;
   sieving the brewer's spent grain after passage through the roll mill to obtain the protein-rich product, containing the protein-rich germs and particles, as a minus fraction and the husks as a plus fraction; and
   contacting said protein-rich product with a solvent for said lipids to extract lipids from said protein-rich product and thereby produce said defatted protein-rich product.

* * * * *